United States Patent [19]

Bos et al.

[11] Patent Number: 4,582,396
[45] Date of Patent: Apr. 15, 1986

[54] FIELD SEQUENTIAL COLOR DISPLAY SYSTEM USING OPTICAL RETARDATION

[75] Inventors: Philip J. Bos, Portland; Philip A. Johnson, Jr., Beaverton, both of Oreg.

[73] Assignee: Tektronix, Inc., Beaverton, Oreg.

[21] Appl. No.: 493,106

[22] Filed: May 9, 1983

[51] Int. Cl.$^4$ .................................................. G02F 1/13
[52] U.S. Cl. .................... 350/347 E; 350/341; 350/346; 340/702; 358/61; 358/64
[58] Field of Search ............... 350/341, 347 R, 347 V, 350/347 E, 400, 405, 346; 358/61, 64; 340/702

[56] References Cited

U.S. PATENT DOCUMENTS

| | | | |
|---|---|---|---|
| 2,493,200 | 1/1950 | Land | 358/61 X |
| 2,638,816 | 5/1953 | Stolzer . | |
| 2,834,254 | 5/1958 | Sage | 358/61 X |
| 3,131,253 | 4/1964 | Zandman et al. | 350/405 X |
| 3,431,418 | 3/1969 | Stone . | |
| 3,785,721 | 1/1974 | Harsch | 350/347 |
| 4,003,081 | 1/1977 | Hilsum et al. | 358/61 X |
| 4,019,808 | 4/1977 | Scheffer . | |
| 4,097,128 | 6/1978 | Matsumoto et al. | 350/335 |
| 4,232,948 | 11/1980 | Shanks | 350/347 R |
| 4,239,349 | 12/1980 | Scheffer | 350/347 R |
| 4,272,195 | 6/1981 | Kaye | 350/347 X |
| 4,295,093 | 10/1981 | Middleton | 324/77 B |
| 4,328,493 | 5/1982 | Shanks et al. | 350/346 X |
| 4,334,734 | 6/1982 | Hareng et al. | 350/334 X |
| 4,400,060 | 8/1983 | Cheng | 350/340 X |
| 4,436,376 | 3/1984 | Fergason | 350/347 E X |

FOREIGN PATENT DOCUMENTS

| | | |
|---|---|---|
| 55-142316 | 11/1980 | Japan ............ 350/341 |
| 0869713 | 6/1961 | United Kingdom . |
| 1404945 | 9/1975 | United Kingdom . |
| 1466715 | 3/1977 | United Kingdom . |
| 1526559 | 9/1978 | United Kingdom . |
| 1569516 | 6/1980 | United Kingdom . |
| 2048506A | 12/1980 | United Kingdom . |

OTHER PUBLICATIONS

Raynes, E. P. et al., "Fast-Switching Twisted Nematic Electro-Optical Shutter & Color Filter," *Electronics Lett.,* vol. 10, No. 7 (Apr. 1974) pp. 114–115.

Armitage, D., "Liquid Crystal Voltage Controlled Retardation Display," *Applied Optics,* vol. 19, No. 13, (Jul. 1980) pp. 2235–2239.

Scheffer, T. J., "New Multicolor Liquid Crystal Displays That Use a Twisted Nematic Electro-Optical Cell," *J. Applied Physics,* vol. 44, No. 11, (Nov. 1973) pp. 4799–4803.

Van Doorn, C. Z., "Transient Behavior of a Twisted Nematic Liquid Crystal Layer . . . " *Journal De Physique,* vol. 36, pp. Cl. 261–263.

Fergason, J. L., "Performance of a Matrix Display Using Surface Mode," *1980 Biennial Display Research Conference, IEEE* (Jun. 1980) pp. 177–179.

Brinson, A. N. et al., "Liquid Crystal Apparatus for Converting B & W CRT Display into Colored Display," *IBM Technical Disclosure Bull.,* vol. 22, No. 5, Oct. 1979, pp. 1769–1772.

Smith, K. "Liquid-Crystal Shutter Changes Monochrome TV Images into Color," *Electronics,* vol. 54, No. 6 (Mar. 1981) pp. 81–82.

*Primary Examiner*—John K. Corbin
*Assistant Examiner*—Richard F. Gallivan
*Attorney, Agent, or Firm*—John D. Winkelman; Paul S. Angello

[57] ABSTRACT

A field sequential color display system incorporates a color switch which includes a zero to half-wave optical retarder and pleochroic filters to provide an image with high color contrast and resolution over a broad range of display sizes. In a preferred embodiment, a liquid crystal cell which operates between two states of optical retardation comprises the variable retarder to provide a color switch with substantially reduced optical response times.

31 Claims, 8 Drawing Figures

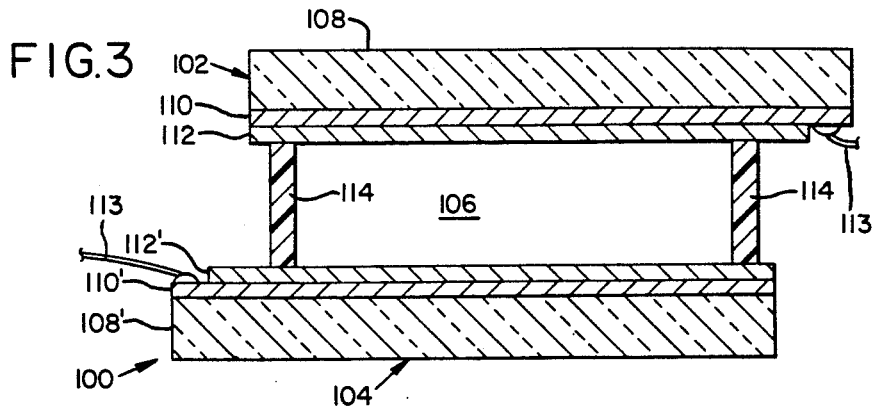
FIG. 3
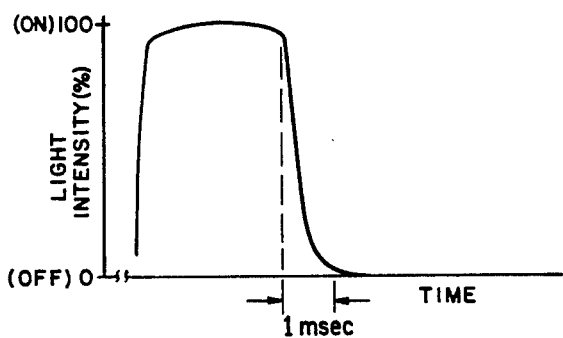
FIG. 5
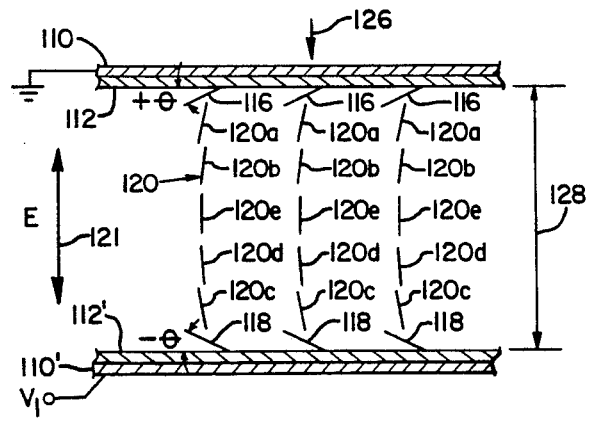
FIG. 4A (ON)
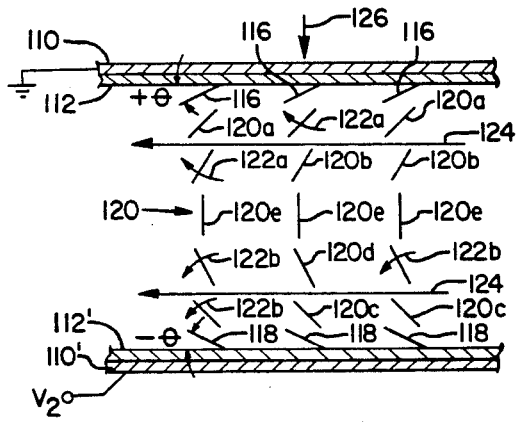
FIG. 4B (OFF)
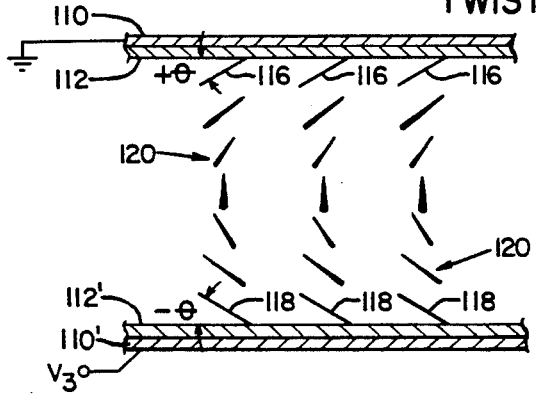
FIG. 4C (OFF + T₁ = π RADIAN TWIST)
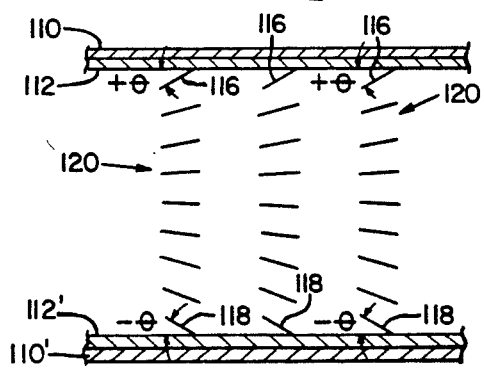
FIG. 4D (OFF + T₂ : SPLAYED)

FIELD SEQUENTIAL COLOR DISPLAY SYSTEM USING OPTICAL RETARDATION

TECHNICAL FIELD

This invention relates to variable color display systems, and in particular, a field sequential color display system which incorporates a high-speed color switch that includes a zero to half-wave optical retardation device and pleochroic polarizers to provide an image with high color contrast and resolution over a broad range of display sizes.

BACKGROUND OF THE INVENTION

Field sequential color display systems which incorporate electro-optic shutters or color switches heretofore have combined the polarization switching capabilities of a twisted nematic liquid crystal electro-optical cell with anisotropic optical properties of separate passive optical elements in an attempt to provide a display with an acceptable color contrast ratio. The transmissive twisted nematic liquid crystal cell is typically included as a two-color switch in an assembly of optical components in which the cell is positioned between two crossed red and green polarizers and a neutral analyzing polarizer near the viewer. If the absorption axis of the analyzing polarizer is aligned with the absorption axis of the red polarizer, the liquid crystal in the absence of an electric field twists through 90° the plane in which the polarized light vibrates so that only a red image passes through the analyzing polarizer. In the presence of an electric field, the liquid crystal cell is turned "ON" and passes the polarized light without rotation so that a green image appears on the analyzing screen.

Display devices incorporating twisted nematic crystal cells that have possible application in sequential color display systems are disclosed in U.S. Pat. Nos. 4,019,808 and 4,239,349 of Scheffer. Color display systems incorporating a twisted nematic liquid crystal cell are disclosed in U.S. Pat. No. 4,003,081 of Hilsum, et al. and U.S. Pat. No. 4,295,093 of Middleton.

It is well known that the twisted nematic cell possesses a relatively slow turn-off time and, therefore, is unacceptable for applications such as a color switch in frame synchronized field sequential color television type display systems. Such systems require the use of a color switch which is capable of responding to signals from synchronization circuits which operate at frame rates of relatively high speed to provide a flicker-free image on the display. To overcome this disadvantage inherent in the twisted nematic cell, cells have been fabricated which include liquid crystal materials characterized as having a dielectric anisotropy that changes from a positive to a negative value as a function of the frequency of a switching signal which is applied to the cell.

A cell which includes liquid crystal material of this type is disclosed in the publication by Raynes and Shanks: "Fast-Switching Twisted Nematic Electro-Optical Shutter and Color Filter," *Electronics Letters*, Vol. 10, No. 7, pp. 114–115, Apr. 4, 1974. The cell described therein includes a liquid crystal material having a variable dielectric anisotropy mixture which is positive in an electric field produced by a low frequency signal and negative in an electric field produced by a relatively high frequency signal. Thus, the application of a low frequency signal to a twisted nematic cell of this type turns the device "ON," and a high frequency signal pulse forcibly returns the cell to its twisted "OFF" state.

The two-frequency twisted nematic device suffers from the disadvantage of requiring the use of a complex driver which is capable of delivering high frequency signal pulses at high voltage levels to the capacitive load presented by the liquid crystal cell. In addition, it is difficult to make such cells which are capable of uniform switching over large areas and which do not present on a display an image having a patchy appearance. Two-frequency materials also suffer from an inability to operate outside a limited temperature range.

Another optical effect which has been used in liquid crystal display applications is tunable birefringence. A commonly used device of this type is described in the publication "Transient Behavior of Twisted Nematic Liquid-Crystal Layer in an Electric Field," *Journal De Physique*, Vol. 36, pp. Cl-261–Cl-263 by C. F. Van Doorn. The liquid crystal cell described in the publication by Van Doorn has alignment directors which form tilt bias angles of the same rotational sense as measured from the surface of the cell electrodes. Such a cell, however, experiences "optical bounce" and a consequent protracted relaxation time which render the cell unusable in applications that require short transition times between switching states. The Van Doorn publication states that liquid crystal material flow within the relaxing cell is responsible for the occurrence of the optical bounce phenomenum. The direction of liquid crystal material flow within the cell appears to apply a reverse torque to the local directors centrally located within the cell, which torque is in opposition to the direction of local director realignment during relaxation of the cell and thereby causes optical bounce and increased relaxation times.

A variable retardation device including a liquid crystal cell of substantial thickness which eliminates optical bounce and thereby possesses short relaxation times between optical states is reported in a publication "Performance of a Matrix Display Using Surface Mode," 1980 *Biennial Display Research Conference Proceedings*, pp. 177–179 by James L. Fergason. The device described in the publication by Fergason is unacceptable in most image display applications, however, because of its severely restricted cone of view, which is inherent in liquid crystal cells of substantial thickness.

A device using the properties of birefringence in materials other than liquid crystals is disclosed in U.S. Pat. No. 2,638,816 of Stolzer which describes an adapter to generate color images from a black and white television set. The adapter of Stolzer includes a cell which experiences the Kerr effect, which is the designation of the characteristic of certain isotropic substances that become doubly refractive in the presence of an electric field.

The adapter of Stolzer polarizes light emitted from the television set. The Kerr cell receives the polarized light and separates it into orthogonally related components. The amount of retardation of one of these components relative to the other varies as the function of the electric field strength produced by an external voltage which is applied to the cell electrodes and which varies in synchronism with the frame sequential operation of the television set. The light is then passed through passive birefringent sheets to produce a light output in different colors. One disadvantage inherent in the device of Stolzer is that colors developed from passing light through passive birefringent sheets generally are impure and vary in appearance as a function of the viewing angle. The adapter also employs interdigital electrodes which present a pattern of lines across the display screen. Thus, the device of Stolzer produces color images which are not acceptable for most image display applications.

SUMMARY OF THE INVENTION

One of the objects of this invention is to provide a field sequential color display system which provides a display image with improved color contrast and a high degree of brightness and resolution.

Another object of this invention is to provide such a system which employs a variable retarder as a high-speed color switch to provide a flicker-free image on the display.

A further object of this invention is to provide such a system which incorporates a variable retarder in the form of a nematic liquid crystal cell that provides an image which can be observed within a wide range of viewing angles.

Still another object of this invention is to provide such a system which incorporates a liquid crystal variable retarder which possesses short transition times between optical states by virtue of the absence of optical bounce of local directors within the liquid crystal cell.

Yet another object of this invention is to provide such a system which incorporates a liquid crystal variable retarder in which the director alignment causes no reverse torque to be applied to directors centrally located within the cell, thereby to provide an electro-optical response that produces no optical bounce and exhibits short transition times between optical states.

The present invention relates to a field sequential color display system which employs a high-speed color switch that includes a zero to half-wave optical retarder and pleochroic polarizers to select either one of two color components of light included in externally generated light to form a multicolored image on a display screen. The system comprises a source of light and a color sensitive polarizing means which receives the light and has a first absorption axis to pass linearly polarized light of a first color and a second absorption axis to pass linearly polarized light of a second color. The first and second absorption axes are substantially orthogonally oriented in a plane which receives the light. A linear polarizing means is positioned in spaced-apart relation with the color sensitive polarizing means and has its absorption axis aligned substantially in the same orientation as the first absorption axis of the color sensitive polarizing means. A variable optical retarding means is disposed between and optically coupled to the color sensitive polarizing means and the linear polarizing means. The variable optical retarding means has two light communicating surfaces and is characterized in that it is capable of producing essentially half-wave retardation of light of the second color and is oriented so that the projection of its optic axis on each of the two light communicating the surfaces is disposed substantially at 45° angles with respect to each one of the first and second absorption axes. The system further comprises a switching means in communication with the variable optical retarding means to provide first and second switching states. The first switching state provides substantially reduced retardation of light of the first and second colors through the variable optical retarding means to allow the transmission of light of only the second color through the linear polarizing means. The second switching state provides essentially half-wave retardation of light of the second color through the variable optical retarding means to allow transmission of light of only the first color through the linear polarizing means.

The field sequential color display system of the present invention makes use of a variable optical retarder which is tuned to provide in the second switching state half-wave retardation of light of the second one of the two colors transmitted by the color sensitive polarizing means. The optical assembly of the present invention includes color sensitive and neutral polarizers whose absorption axes are oriented so that the transmission of light of the first and second colors is selectively controlled by a switching signal which is applied to the variable retarder. Pure colors are produced in each switching state even though it is possible for the variable retarder to provide half-wave retardation for only one color.

Whenever a drive voltage signal which is applied to the electrodes of the half-wave retarder creates an electric field to position its optic axis to provide substantially reduced retardation of light through the device, light of both the first and second colors is transmitted to a neutral linear polarizer whose absorption axis is aligned with that of the polarizer which is sensitive to the first color. This orientation of the optic axis of the variable retarder accomplishes transmission of only light of the second color through the neutral linear polarizer. Whenever the drive voltage signal which is applied to the electrodes of the variable retarder creates an electric field to position its optic axis to provide half-wave retardation of the second color, light of only the first color is projected by the variable retarder along the transmission axis of and is transmitted through the neutral linear polarizer.

In a preferred embodiment of the invention, the variable retarder is comprised of a nematic liquid crystal cell which remains disclination-free and switches in a bounce-free manner as it is switched between two states which alter the orientation of the surface noncontacting directors of the liquid crystal material in the cell. The use of a liquid crystal cell as a variable retardation device provides a single-frequency, high-speed switch which requires low power drive circuitry to produce a superior display image which can be observed within a wide range of viewing angles.

A field sequential color display system incorporating the optical arrangement in the preferred embodiment of the present invention when synchronized to the frame sequencer provides a flicker-free picture with a multicolor image having sharp contrast and great detail.

Additional objects and advantages of the present invention will be apparent from the following detailed description of a preferred embodiment thereof which proceeds with reference to the accompanying drawings.

BRIEF DESCRIPTION OF THE DRAWINGS

FIG. 3 is a diagrammatic cross-sectional side elevation view of the liquid crystal cell of the present invention.

FIGS. 4A, 4B, 4C, and 4D are schematic diagrams of the director alignment configuration of the liquid crystal cell of the present invention in, respectively, the field aligned ("ON") state, the partly relaxed ("OFF") state, the $\pi$ radian twist state, and the splayed state.

FIG. 5 shows the optical response of a liquid crystal cell of the present invention when switched from its "ON" state to its "OFF" state by the removal of a 20 Vrms AC signal pulse.

DETAILED DESCRIPTION OF PREFERRED EMBODIMENT

General Arrangement and Operation of the Color Display System

Figure 1:
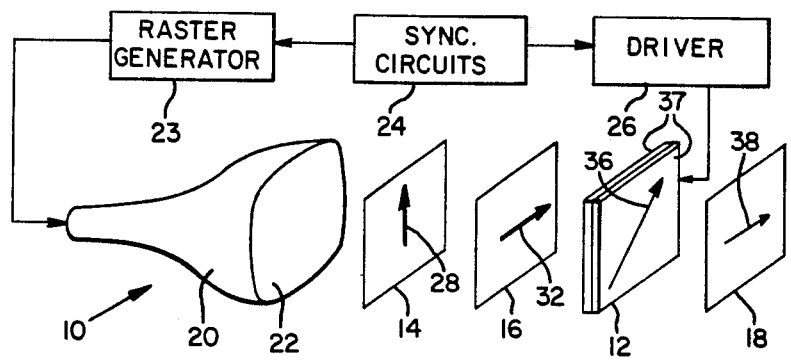
FIG. 1 is a simplified block diagram of a field sequential color display system incorporating a variable retarder which is included in an optical assembly to function as an optical switch in accordance with the present invention.

With reference to FIG. 1, a preferred embodiment of a field sequential color display system 10 designed in accordance with the present invention includes liquid crystal variable optical retarder or retarding means 12 which is disposed between and optically coupled to an orthogonal set of first and second color sensitive pleochroic linear polarizers or means 14 and 16, respectively, and neutral linear polarizer or polarizing means 18. Color sensitive polarizer 14 has an absorption axis which passes light of only the first color, and color sensitive polarizer 16 has an absorption axis which passes light of only the second color. It will be understood that any zero to half-wave optical retarder having an acceptable switching speed may be substituted for the preferred liquid crystal retarder 12 disclosed herein.

The term optical retardation insofar as it herein pertains and is referred to birefringence is defined by way of the following explanation. A light ray incident on a birefringent device is known to be decomposed into two components known as the ordinary and extraordinary light rays. These components of light travel through the birefringent device at different velocities, and when exiting the device, one of the rays is retarded with respect to the other. Retardation results in a relative phase shift between the two exiting rays, which retardation is also related to the wavelength of the exiting ray of light. For example, a device which has an effective birefringence such that $$(\Delta nd/\lambda) = \tfrac{1}{2}$$

is referred to as a half-wave retarder, where $\Delta n$ is the effective birefringence, d is the device thickness, and $\lambda$ is the wavelength of the exiting light ray.

The optical assembly formed by retarder 12 and polarizers 14, 16, and 18 is positioned in front of light image source or generator 20 which emits light from phosphor screen 22 to produce a light image in the red and green colors. In a preferred embodiment of the display system, image generator 20 constitutes a cathode ray tube or a projection device which by means of television type raster scan a signal produced by raster generator 23 in response to the output of frame synchronization circuit 24 presents sequential frames of image information in alternating first and second time intervals.

In the first time interval, information pertaining to both the form of the image which is to appear in a first color, such as red, and the form of the image which is to appear in a color that is a combination of the color red and a second color, such as green, is written on phosphor screen 22. In the second time interval, information pertaining to both the form of the image which is to appear in the color green and the form of the image which is to appear in a color that is a combination of the colors red and green is written on phosphor screen 22. Color polarizers 14 and 16 receive the light transmitted from phosphor screen 22 and orthogonally and linearly polarize it in the red and green colors. The polarized light is then transmitted to the surface of variable retarder 12 proximal to color polarizer 16.

Variable retarder driver 26 receives at its input a signal from the output of frame synchronization circuit 24 to drive variable retarder 12 synchronously with the sequential frame rate of image information produced by image generator 20. During the first time interval, therefore, driver 26 commands variable retarder 12 to its "OFF" state which causes an orientation of its optic axis that accomplishes half-wave retardation of light of the color green. No light of the color green is transmitted through the linear polarizer 18 during this time interval, and the undesired image components in the color green which appeared on phosphor screen 22 during the first time interval are thereby eliminated. The desired image components in the color red are, however, transmitted through retarder 12 and polarizer 18 during the first time interval. During the second time interal, driver 26 commands variable retarder 12 to its "ON" state which causes an orientation of its optic axis that accomplishes reduced retardation of light of all colors passing through polarizers 14 and 16. The orientation of the absorption axis of the linear polarizer 18 absorbs light only of the color red and transmits the color green as will be further hereinafter described.

The alternating image information fields provided in the first and second time intervals are transmitted through the first and second color sensitive polarizers 14 and 16 and are synchronously transmitted by retarder 12 and linear polarizer 18. The retinal persistence of the observer's eye integrates the information presented at polarizer 18 during the two intervals of time corresponding to alternate frames of the television raster signal to create the impression of a single, multicolored image. Intensity modulation of the light image source will produce a color gamut within a spectral range of between the red and green colors.

Optical Component Orientation

Figure 2:
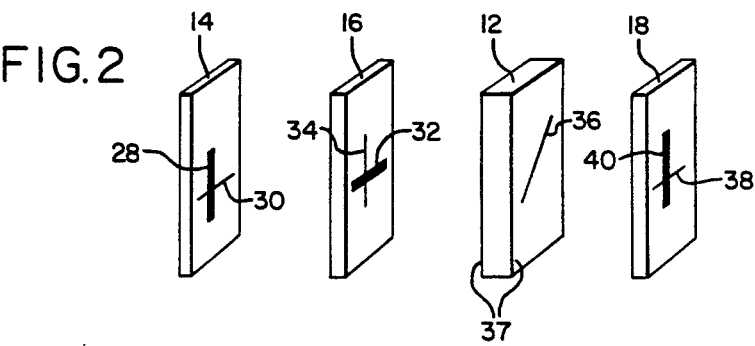
FIG. 2 is a diagram showing the orientation of the absorption axes of the polarizing filters in relation to the optic axis of the variable retarder in accordance with the present invention.

With reference to FIG. 2, the depicted orientation of the absorption axes of polarizers 14, 16, and 18 provides the desired switching between two colors. The projection 36 of the optic axis of variable retarder 12 on each of the two light communicating surfaces 37 thereof is disposed substantially at 45° angles with respect to each of the absorption axes of polarizers 14 and 16.

Pleochroic linear polarizer 14 transmits light polarized along its vertically disposed absorption axis 28 containing the colors in the visible spectrum in the vicinity of the color red and transmits along its horizontally disposed transmission axis 30 all colors in the visible spectrum. Pleochroic linear polarizer 16 transmits light polarized along its horizontally disposed absorption axis 32 containing the colors in the visible spectrum in the vicinity of the color green and transmits along its vertically disposed transmission axis 34 all colors in the visible spectrum. The combination of pleochroic polarizers 14 and 16, therefore, constitutes a color sensitive polarizing means which orthogonally polarizes light of the red and green colors transmitted from phosphor screen 22.

Whenever variable retarder 12 is in the "OFF" state, its optic axis 36 is oriented so that the light of the color green is transformed to light which is linearly polarized perpendicular to transmission axis 38 of and which is absorbed by neutral polarizer 18. The horizontally disposed transmission axis 38 of linear polarizer 18 transmits light of the color red. Transmission axis 38 is disposed at right angles to absorption axes 28 of red color sensitive polarizer 14 to allow transmission of light in red color which is projected along the direction of transmission axis 38 by retarder 12.

Whenever variable retarder 12 is in the "ON" state, its optic axis is positioned so that there is substantially reduced optical retardation of light of both the red and green colors passing through polarizers 14 and 16. The vertically disposed absorption axis 40 of linear polarizer 18 is oriented in the same direction as absorption axis 28 of red color sensitive polarizer 14 and, therefore, absorbs light of the red color since retarder 12 does not retard incident light of either color in its "ON" state. Since linear polarizer 18 passes light of all colors along its transmission axis 38, light of the color green is transmitted therethrough.

Liquid Crystal Variable Retarder

As was stated earlier, a preferred embodiment of the present invention incorporates a liquid crystal cell operating as a zero to half-wave optical retarder which controls the retardation of light passing therethrough in response to the intensity of an electric field produced by an excitation voltage applied to the cell electrode structures.

With reference to FIG. 3, liquid crystal cell 100 includes a pair of generally parallel, spaced-apart electrode structures 102 and 104 with nematic liquid crystal material 106 included therebetween. Electrode structure 102 comprises glass dielectric substrate 108 which has on its inner surface a layer 110 of electrically conducting, but optically transparent, material such as indium tin oxide. Director alignment film layer 112 is applied to conductive layer 110 and forms a boundary between electrode structure 102 and liquid crystal material 106. The surface of film 112 which contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structures 102 and 104 are offset relative to each other to provide access to conductive layers 110 and 110' for connecting at terminals 113 the output conductors of retarder driver 26. Spacers 114 may be comprised of any suitable material such as glass fiber to preserve the general parallel relation between electrode structures 102 and 104.

With reference to FIGS. 4A-4D, the nematic director alignment configuration of layers 112 and 112' in liquid crystal cell 100 is described in Column 7, lines 48-55 of U.S. Pat. No. 4,333,708 of Boyd, et al. It will be understood, however, that the liquid crystal cell described in the Boyd, et al. patent differs from that of the present invention in that the former includes an alternating-tilt geometry type configuration of which the director alignment of cell 100 comprises only a portion. The cell of the Boyd, et al. patent is constructed to promote disclination movement within the cell in an attempt to provide a bistable switching device.

The film layer 112 of electrode structure 102 is conditioned so that the electrode structure surface contacting directors 116 are aligned parallel to each other at a tilt bias angle $+\theta$, which is measured in the counterclockwise sense with reference to the surface of film layer 112. The film layer 112' of electrode structure 104 is conditioned so that the electrode structure surface contacting directors 118 are aligned parallel to each other at a tilt bias angle $-\theta$ which is measured in the clockwise sense with reference to the surface of film layer 112'. Thus, liquid crystal cell 100 is fabricated so that the surface contacting directors 116 and 118 of the opposed surfaces of director alignment layers 112 and 112' of electrode structures 102 and 104, respectively, are tilt-biased in opposite directions.

A first preferred method of effecting the desired alignment of the surface contacting directors entails the use of polyimide as the material which comprises the alignment film layers 112 and 112' on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 4A depicts the orientation of surface noncontacting directors 120 when an AC signal $V_1$ of approximately 2 kHz and 20 Vrms is applied to conductive layers 110 and 110' of electrode structures 102 and 104, respectively. The signal $V_1$ on conductive layer 110' with conductive layer 110 grounded constitutes a first switching state produced at the output of driver 26 and produces an alternating electric field, E, between electrode structures 102 and 104 within the liquid crystal cell 100 to force the cell into its "ON" state. A substantial number of the surface noncontacting directors 120 of a liquid crystal material 106 which has a positive anisotropy value align essentially end-to-end along direction 121 of the electric field flux lines within the cell, which direction is normal to the conditioned surfaces of the electrode structures. Thus, when cell 100 is excited into its "ON" state, the surface noncontacting directors 120 are aligned perpendicularly to the surfaces of the cell. It should be noted that the surface contacting directors 116 and 118 substantially maintain their tilt bias angles $|\theta|$ in the two topological states of the cell, the first of which states is shown in FIGS. 4A to 4C and the second of which states is shown in FIG. 4D.

FIG. 4B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces which cause relaxation of the surface noncontacting directors from the end-to-end alignment of the "ON" state. The removal of signal $V_1$ constitutes a second switching state produced at the output of driver 26. The director orientation shown in FIG. 4B corresponds to that of "OFF" state of the cell.

Switching cell 100 to the "OFF" state can also be accomplished by applying to layer 110' of an AC signal $V_2$ produced at the output of driver 26 having a voltage level which is less than that of signal $V_1$ and generally near 0V. The frequency of signal $V_2$ is generally the same as that of signal $V_1$.

During the transition from the "ON" state to the "OFF" state of the liquid crystal cell, the surface noncontacting directions recede from the end-to-end alignment normal to the electrode structure surfaces and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 100 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

It should be noted that the surface geometry of cell 100 differs from that of a conventional liquid crystal variable retardation cell such as the one described in the publication by Van Doorn in which the tilt bias angles are of the same rotational sense as measured from the inner surfaces of the electrode structure. The surface contacting director configuration of cell 100 induces rapid surface noncontacting director relaxation without any optical bounce from the "ON" state to the "OFF" state. It is presently believed that the rapid, optical bounce-free director relaxation is caused by the flow of liquid crystal material in the same direction 124 along both conditioned surfaces of the cell. Such unidirectional flow does not occur in the conventional cell described in the publication by Van Doorn which cell experiences liquid crystal material flow in opposite directions along the conditioned surfaces. The beneficial effect of the unidirectional material flow in cell 100 is that no "reverse" torque is applied to the centrally located surface noncontacting directors 120e by such flow in the relaxing cell. The result is that bounce-free, rapid electro-optical switching is achieved.

FIG. 4C depicts the orientation of the directors after a time $T_1$ during which liquid crystal cell 100 is allowed to relax further beyond the "OFF" state shown in FIG. 4B. This will occur generally if an electric field is not reintroduced within the cell after approximately 50 milliseconds has elapsed from the time the electric field had been removed. The director configuration of the cell shown in FIG. 4C is characterized in that the surface noncontacting directors 120 relinquish their planar configuration and assume what is referred to as a $\pi$ radian twist or helical configuration. With further relaxation, the cell in the $\pi$ radian twist configuration will experience disclination movement and degenerate over a time period $T_2$ of approximately several minutes to the splayed configuration depicted in FIG. 4D. It should be noted that the periodic application of an AC signal $V_3$ of approximately 1V to layer 110' of the cell will prevent further relaxation of the surface noncontacting directors to the $\pi$ radian twist state.

The method of operating the liquid crystal cell 100 as a zero to half-wave optical retarder is directed to the disclination-free surface noncontacting director relaxation from the electric field aligned or "ON" state depicted by FIG. 4A to the planar configuration or "OFF" state depicted by FIG. 4B.

In the present invention, liquid crystal cell 100 is operated as a zero to half-wave optical retarder whose optic axis corresponds to the alignment direction of the nonsurface contacting directors 120.

Linearly polarized light which propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a negligible projection of the optic axis on the electrode structure surfaces of the cell. Under these conditions, liquid crystal cell 100 produces substantially reduced optical retardation for incident light propagating in the direction 126.

Linearly polarized light which propagates in direction 126 normal to the surfaces of electrode structures 102 and 104 is noncoincident with the alignment direction of surface noncontacting directors when the liquid crystal cell is in the "OFF" state. Directors 120 are oriented in such "OFF" state so that each one of a substantial number of them projects a component on the electrode structure surfaces of the cell. Under these conditions, liquid crystal cell 100 has an effective birefringence for generally normally incident light. The orientation of surface noncontacting directors 120 provides essentially half-wave optical retardation for light of the wavelength which satisfies the mathematical expression:

$$(\Delta n d / \lambda) = \tfrac{1}{2}$$

where d represents the thickness 128 and $\Delta n$ represents the effective birefringence of the cell.

With reference to FIG. 5, the optical response of a liquid crystal cell operated in accordance with the present invention is shown to provide approximately a 1.0 millisecond transition time between the "ON" and the "OFF" states of the cell. This response time was accomplished with a cell fabricated with E-44 type liquid crystal material manufactured by BDH Chemicals Ltd. of Poole, England, of 3 micron thickness and driven by a +20 Vrms 2 kHz pulse. This relatively fast optical response is attributed to the elimination of optical bounce that has been accomplished by virtue of the promotion of unidirectional flow of liquid crystal material within the cell during surface noncontacting director realignment which occurs between the transition from the "ON" state to the "OFF" state.

Alternatives and Equivalents

It will be understood that liquid crystal cell 100 can include a liquid crystal material mixture which is characterized by a dielectric anisotropy that changes sign as a function of the frequency of an AC signal which is applied to the cell. Thus, when a low frequency signal such as 200-500 Hz is applied to electrode structures 102 and 104 of the liquid crystal cell, the surface noncontacting directors 120 would tend to align parallel to the electric field direction and normal to the cell surfaces, thereby to assume the "ON" state. On the other hand, when a high frequency signal pulse such as 80-100 kHz is applied to the cell, the surface noncontacting directors 120 would tend to align perpendicularly to the electric field direction and parallel to the cell surfaces. The application of a high frequency signal pulse of sufficient duration would cause the cell to obtain an overall director configuration which would produce half-wave retardation. It is preferred, however, that the liquid crystal cell be used as a single-frequency half-wave retarder to eliminate the need of a complex, high-power drive signal source.

Liquid crystal cell 100 may also be used as a variable optical retarder which provides continuously varying amounts of retardation through the cell of light incident to a surface thereof. In the case of a single-frequency liquid crystal cell, such would be accomplished by adjusting the voltage of the AC signal which is applied to cell 100 to a level which orients the surface noncontacting directors in a configuration that provides the desired first amount of optical retardation. An increase in the signal voltage applied to the cell produces a corresponding decrease in the amount of director component projection on the surface of the cell, and thereby a second, decreased amount of optical retardation of light incident to the cell.

In the case of a two-frequency liquid crystal cell, continuously varying amounts of retardation would be produced by applying to a cell 100 initially in the "OFF" state a low frequency signal of a first voltage which is sufficient to orient the surface noncontacting directors in a configuration that provides the desired first amount of optical retardation. Continual application of such low frequency signal will prevent the cell from further relaxation and thereby maintain substantially constant optical retardation in the desired first amount. To change the first amount of retardation to a second higher amount of retardation, a high frequency signal pulse of sufficient duration is applied to reorient the surface noncontacting directors to a configuration corresponding to the second retardation state. Continual application of a low frequency signal of a second voltage which is less than the first voltage will prevent the cell from further relaxation and thereby maintain substantially constant optical retardation in the desired second amount.

It is also possible for cell 100 to be included in an optical assembly which switches from a black state to a transparent state. Since it is not possible for liquid crystal cell 100 in the "OFF" state to transform all wavelengths of linearly polarized light to such light which is reconstituted at a 90° angle from the incident polarization direction, black is selected to be the "ON" state.

With reference to FIG. 2, the optical components required in this example to accomplish the desired light switching include only polarizers 16 and 18 and retarder 12 which incorporates cell 100. Polarizer 16 would be of a neutral type which absorbs all light polarized along absorption axis 32. In the "ON" state of retarder 12, all light transmitted by polarizer 16 would be completely absorbed along absorption axis 40 of polarizer 18. In the "OFF" state of retarder 12, most of the light transmitted by polarizer 16 would be transmitted by polarizer 18 if cell 100 is tuned (i.e. by selecting the appropriate cell thickness for the particular type of liquid crystal material used) to accomplish half-wave retardation for a wavelength approximately in the middle of the visible spectrum.

It will be obvious to those having skill in the art that many changes may be made in the above-described details of the preferred embodiment of the present invention. The scope of the present invention, therefore, should be determined only by the following claims.

We claim:

1. A high-speed field sequential color display system, comprising:
   a light source that emits light rays of plural wavelengths;
   first and second light polarizing means in optical communication with the light source, the first light polarizing means including a color sensitive polarizing filter;
   liquid crystal variable optical retarding means disposed between the first and second light polarizing means; and
   switching means in communication with the variable optical retarding means to selectively provide first and second switching states to produce respective first and second amounts of optical retardation to develop over a relatively broad range of viewing angles a light output of one of two colors.

2. The display system of claim 1 in which the color sensitive polarizing filter includes first and second pleochroic linear polarizers having orthogonally aligned absorption axes, the absorption axis of the first pleochroic polarizer transmitting light of a first color and the absorption axis of the second pleochroic polarizer transmitting light of a second color.

3. The display system of claim 2 in which the variable optical retarding means is a zero to substantially half-wave retarder for light of the second color, and the first retardation amount is essentially zero retardation to develop a light output of the second color and the second retardation amount is essentially half-wave retardation to develop a light output of the first color.

4. The display system of claim 1 which also includes light modulation means for modulating the light rays emitted from the light source in synchronism with the switching means to produce an image having a multicolored appearance.

5. The display system of claim 1 in which the variable optical retarding means comprises a liquid crystal cell having liquid crystal material with alignment directors, the liquid crystal cell being responsive to electric fields of different intensities introduced within the cell by the first and second switching states of the switching means, the first switching state providing a higher intensity electric field to cause the directors to align substantially end-to-end in a direction parallel to the flux lines of the electric field and the second switching state providing a lower intensity electric field to cause the directors to recede from the end-to-end alignment to an alignment in which a component of each one of a substantial number of the directors is projected on the surfaces of the cell.

6. The display system of claim 1 in which the variable optical retarding means comprises a liquid crystal cell having a mixture of liquid crystal material with alignment directors and a variable dielectric anisotropy which is frequency dependent, the liquid crystal cell being responsive to signals of different frequencies applied to the cell by the first and second switching states of the switching means, the first switching state providing a lower frequency signal which introduces a first alternating electric field within the cell to cause the directors to align in a direction parallel to the flux lines of the first electric field and the second switching state providing a higher frequency signal which introduces a second alternating electric field within the cell to cause the directors to align in a direction not parallel to the flux lines of the second electric field.

7. The display system of claim 1 in which the first retardation amount is essentially zero retardation of the two colors and the second retardation amount is essentially half-wave retardation of one of the two colors.

8. The display system of claim 7 in which each one of the light outputs is of an essentially pure color.

9. The display system of claim 1 in which the variable optical retarder includes a liquid crystal cell comprising liquid crystal material contained between a pair of opposed electrode structures, the inner surface of each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

10. The display system of claim 1 in which the variable optical retarding means comprises a liquid crystal cell having liquid crystal material with alignment directors, the liquid crystal cell being responsive to an electric field introduced within the cell by the switching means, the first switching state providing an electric field of sufficient intensity to cause the directors to align substantially end-to-end in a direction parallel to the flux lines of the electric field and the second switching state providing the absence of an electric field to cause the directors to recede from the end-to-end alignment to an alignment in which a component of each one of a substantial number of the directors is projected on the surfaces of the cell.

11. A method for using a liquid crystal cell as a relatively high-speed variable retardation device to vary the retardation of light propagating within the cell, the liquid crystal cell comprising liquid crystal material which has directors and is contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface, the steps comprising:

providing within the cell an electric field of a character that causes alignment of at least some of the surface noncontacting directors to a first configuration to provide a first amount of optical retardation of the light propagating within the cell; and changing the character of the electric field within the cell to cause alignment of at least some of the surface noncontacting directors to a partly relaxed configuration defined by the intermolecular elastic forces within the cell to provide in a relatively short time a second amount of optical retardation of the light propagating within the cell.

12. A method for using a liquid crystal cell as a relatively high-speed variable retardation device to vary the retardation of light transmitted therethrough from an external source, the liquid crystal cell comprising liquid crystal material which has directors and is contained between a pair of opposed electrode structures, the inner surface of each electrode structure including a director alignment layer which has been conditioned so that the directors of the liquid crystal material in contact therewith become substantially uniformly aligned to form tilt bias angles with the conditioned surface, the tilt bias angles of the directors in contact with one conditioned surface being defined in a rotational sense opposite to the tilt bias angles of the directors in contact with the other conditioned surface, the steps comprising:

applying a first signal to the conductive layers of the cell to produce an electric field to cause a substantial number of the surface noncontacting directors to align essentially end-to-end in a direction normal to the conditioned surfaces to provide substantially reduced optical retardation through the cell of light incident to one of the surfaces of the electrode structures; and applying a second signal to the conductive layers of the cell to change the electric field to cause at least some of the surface noncontacting directors within the interior of the cell to recede from the end-to-end alignment to provide in a relatively short time essentially half-wave optical retardation of light incident to one of the surfaces of the electrode structures.

13. A method for using a liquid crystal cell as a relatively high-speed variable retardation device to modulate light transmitted therethrough from an external source, the liquid crystal cell comprising liquid crystal material which has directors and is contained between a pair of opposed electrode structures, the inner surface of each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface, the steps comprising:

applying a first signal to the conductive layers of the cell to produce an electric field to cause a substantial number of the surface noncontacting directors to align essentially end-to-end in a direction normal to the conditioned surfaces to provide substantially reduced optical retardation through the cell for light incident to one of the electrode surfaces; and applying a second signal to the conductive layers of the cell to change the electric field and cause rotational realignment of the surface noncontacting directors to provide essentially half-wave optical retardation for light incident to one of the electrode surfaces, the rotational realignment of the surface noncontacting directors characterized in that such rotation causes a unidirectional flow of liquid crystal material within the cell to eliminate optical retardation bounce during realignment, thereby to decrease the optical response time of the cell.

14. A liquid crystal variable optical retarder having a relatively short relaxation time, comprising:

a liquid crystal cell which includes liquid crystal material which has directors and is contained between a pair of opposed electrode structures, the cell having an optical thickness that does not cause its optical retardation to vary appreciably over a relatively broad range of angles of light incident on the cell, and the inner surface of each electrode structure including a director alignment layer which has been conditioned so that the directors of the liquid crystal material in contact therewith become substantially uniformly aligned to form tilt bias angles with the conditioned surface, the tilt bias angles of the directors in contact with the conditioned surface of one electrode structure being defined in a rotational sense opposite to the tilt bias angles of the directors in contact with the conditioned surface of the other electrode structure; and means in communication with the cell for receiving signals for applying an electric field to the cell to cause a substantial number of the surface noncontacting directors to align in substantially end-to-end relation in a direction normal to the conditioned surfaces to provide substantially reduced optical retardation through the cell of light incident to one of the surfaces of the electrode structures, and for changing the electric field to cause at least some of the surface noncontacting directors within the interior of the cell to recede from the end-to-end alignment to provide in a relatively short time essentially half-wave optical retardation of light incident to one of the surfaces of the electrode structures.

15. A method for providing a liquid crystal cell having nonuniform director alignment which can be used as a variable retardation device to accomplish with relatively short relaxation time the modulation of light transmitted therethrough from an external source, the steps comprising:

applying an electrically conductive layer to one surface of each of two optically transparent dielectric members to form a pair of electrode structures;

conditioning one surface of each of the pair of electrode structures so that the directors of a liquid crystal material placed thereon will align in a predetermined direction;

positioning each electrode structure of the pair so that the conditioned surfaces thereof are in spaced-apart and opposed face-to-face relation;

introducing a liquid crystal material between the electrode structures to form an anisotropic cell;

orienting the electrode structures so that the directors of the liquid crystal material in contact with the conditioned surfaces align substantially uniformly to form tilt bias angles with the conditioned surfaces, the tilt bias angles of the directors in contact with one conditioned surface being defined in a rotational sense opposite to the tilt bias angles of the directors in contact with the other conditioned surface; and applying alternately to the cell a first signal to provide an electric field to cause a substantial number of the surface noncontacting directors to align in essentially end-to-end relation in a direction normal to the conditioned surfaces to provide substantially reduced optical retardation through the cell of light incident to one of the surfaces of the electrode structures, and a second signal to change the electric field to cause at least some of the surface noncontacting directors within the interior of the cell to recede from the end-to-end alignment to provide in a relatively short time essentially half-wave optical retardation of light incident to one of the surfaces of the electrode structures.

16. The method of claim 15 which further comprises the step of introducing liquid crystal material of a different thickness into the cell to provide essentially half-wave retardation of light of a different wavelength.

17. A high-speed color switch that receives light of plural wavelengths emitted from a light source, comprising:

first and second light polarizing means in optical communication with the light source, the first light polarizing means including a color sensitive polarizing filter;

liquid crystal variable optical retarding means disposed between the first and second light polarizing means; and means in communication with the variable optical retarding means for receiving signals to selectively produce first and second amounts of retardation to develop over a relatively broad range of viewing angles a light output of one of two colors.

18. The color switch of claim 17 in which the first amount is essentially zero retardation of the two colors and the second amount is essentially half-wave retardation of one of the two colors.

19. The color switch of claim 18 in which each one of the light outputs is of an essentially pure color.

20. The color switch of claim 17 in which the color sensitive polarizing filter comprises first and second pleochroic linear polarizers having orthogonally aligned absorption axes, the absorption axis of the first pleochroic linear polarizer transmitting light of a first color and the absorption axis of the second pleochroic linear polarizer transmitting light of a second color.

21. The color switch of claim 20 in which the variable optical retarding means is a zero to substantially half-wave retarder for light of the second color, and the first retardation amount is essentially zero retardation to develop a light output of the second color and the second retardation amount is essentially half-wave retardation to develop a light output of the first color.

22. The color switch of claim 17 in which the variable optical retarder includes a liquid crystal cell comprising liquid crystal material contained between a pair of opposed electrode structures, the inner surface of each electrode structure including a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface.

23. A high-speed color switch that receives light of plural wavelengths emitted from a light source, comprising:
- first and second light polarizing means in optical communication with the light source, the first light polarizing means including a color sensitive polarizing filter;
- variable optical retarding means disposed between the first and second light polarizing means; and
- means in communication with the variable optical retarding means for receiving signals to selectively produce first and second amounts of retardation to develop a light output of one of two essentially pure colors.

24. The color switch of claim 23 in which the variable optical retarding means is tuned to provide half-wave retardation of a predetermined color which is one of the two essentially pure light output colors.

25. The color switch of claim 23 in which the variable optical retarding means is a zero to substantially half-wave retarder of light of one of the two colors, and the first retardation amount is essentially zero retardation to develop a light output of the one color, and the second retardation amount is essentially half-wave retardation to develop a light output of the other color.

26. A high-speed color switch that receives light of plural wavelengths emitted from a light source, comprising:
- first and second light polarizing means in optical association with the light source and variable optical retarding means, the variable optical retarding means including a liquid crystal cell comprising liquid crystal material which has directors and is contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to the tilt bias angles of the directors in contact with the other conditioned surface; and
- means in communication with the variable optical retarding means for receiving first and second signals to selectively provide respective first and second amounts of optical retardation of light propagating within the cell,
- the first signal providing within the cell an electric field of a character that causes alignment of at least some of the surface noncontacting directors to a first configuration to provide the first amount of optical retardation that develops a light output of a first color, and the second signal changing the character of the electric field within the cell to cause alignment of at least some of the surface noncontacting directors to a partly relaxed configuration defined by the intermolecular forces within the cell to provide in a relatively short time the second amount of optical retardation that develops a light output of a second color.

27. A liquid crystal variable optical retarder having a relatively short relaxation time, comprising:
- a liquid crystal cell which includes liquid crystal material which has directors and is contained between a pair of opposed electrode structures, the cell having an optical thickness that does not cause its optical retardation to vary appreciably over a relatively broad range of angles of light incident on the cell, and the inner surface of each electrode structure including a director alignment layer which has been conditioned so that the directors of the liquid crystal material in contact therewith become substantially uniformly aligned to form tilt bias angles with the conditioned surface, the tilt bias angles of the directors in contact with the conditioned surface of one electrode structure being defined in a rotational sense opposite to the tilt bias angles of the directors in contact with the conditioned surface of the other electrode structure; and
- means in communication with the variable optical retarding means for receiving signals to develop different amounts of retardation of light passing through the cell.

28. The retarder of claim 27 in which the tilt bias angles have absolute values of less than 30°.

29. A high-speed electro-optic switch that receives light from a light source comprising:
- variable optical retarding means positioned between first and second light polarizing means, the variable optical retarding means comprising a liquid crystal cell which includes liquid crystal material which has directors and is contained between a pair of opposed electrode structures, the inner surface of each electrode structure including a director alignment layer which has been conditioned so that the directors of the liquid crystal material in contact therewith become substantially uniformly aligned to form tilt bias angles with the conditioned surface, the tilt bias angles of the directors in contact with the conditioned surface of one electrode structure being defined in a rotational sense opposite to the tilt bias angles of the directors in contact with the conditioned surface of the other electrode structure; and
- means in communication with variable optical retarding means to selectively develop over a relatively broad range of viewing angles two light output states.

30. The electro-optic switch of claim 29 in which one of the two light output states is a black state and the other light output state is a transparent state.

31. The electro-optic switch of claim 30 in which the variable optical retarding mens develops essentially zero retardation of light passing through it to develop the black state.

* * * * *